United States Patent [19]

Mooney

[11] Patent Number: 4,570,886
[45] Date of Patent: Feb. 18, 1986

[54] LOCKING MECHANISM FOR TRIPOD AND SPREADER LEGS

[76] Inventor: Paul C. Mooney, c/o Quick Set, Inc., 3650 Woodhead Dr., Northbrook, Ill. 60062

[21] Appl. No.: 442,855

[22] Filed: Nov. 18, 1982

[51] Int. Cl.[4] ............................................. F16M 11/08
[52] U.S. Cl. .................................. 248/186; 248/188.6; 403/327; 403/330
[58] Field of Search .................. 248/186, 188.6, 188.2, 248/188.1, 165, 166, 168, 170; 403/330, 327; 292/128, 216, 101, 121, 219

[56] References Cited

U.S. PATENT DOCUMENTS

| | | | |
|---|---|---|---|
| 649,300 | 5/1900 | Hall et al. | 248/166 X |
| 1,131,752 | 3/1915 | Voigt | 292/128 |
| 1,204,228 | 11/1916 | Zanders | 292/128 |
| 1,729,958 | 10/1929 | Morris | 248/165 X |
| 1,941,576 | 1/1934 | Phipps | 292/255 X |
| 1,947,490 | 2/1934 | Poeter | 292/128 |
| 2,161,542 | 6/1939 | Titus | 292/128 |
| 3,313,505 | 4/1967 | Petrie | 248/165 |
| 4,268,076 | 5/1981 | Itoi | 292/216 |

FOREIGN PATENT DOCUMENTS

| | | | |
|---|---|---|---|
| 11372 | of 1891 | United Kingdom | 248/188.1 |
| 1364486 | 8/1974 | United Kingdom. | |
| 2016575A | 9/1979 | United Kingdom. | |

OTHER PUBLICATIONS

Brochure entitled, "Tripods".
Brochure entitled, "Sachtler Motion Picture & Video Camera Support Systems".
Heiwa Brochure entitled, "Tripod Photo-Cine & Video Accessories 'The Sole Technique Since 1950'".
Quick-Set Incorporated Brochure entitled, "Samson Professional Tripods".
Page from a Brochure with bottom title, "The Functional Work Horse for Amateurs and Professionals Studios and Location".
Brochure detailing, "Bogen", tripods and dollies, etc.
Quick-Set Incorporated Brochure entitled, "Hercules Industrial Tripods".

*Primary Examiner*—J. Franklin Foss
*Assistant Examiner*—David L. Talbott

[57] ABSTRACT

A mechanism for interlocking adjustable tripod and spreader legs, including a pin fixed to the tripod leg, a pin receiving slot in the spreader leg, a latch plate pivotable with respect to the spreader leg and including a locking flange for retaining the pin in the slot, and biasing means for positioning the plate in its pin retaining position.

4 Claims, 4 Drawing Figures

LOCKING MECHANISM FOR TRIPOD AND SPREADER LEGS

DESCRIPTION

1. Field of the Invention

This invention relates to a tripod and spreader and more particularly to a locking mechanism for the interconnection of tripod and spreader legs.

2. Background of the Invention

Tripods are used extensively today to support expensive equipment, including a wide range of types of cameras. Since however tripod legs are pivotable about a tripod plate, in some cases as when placed on a smooth surface there is a need to restrain the legs to prevent them from sliding outward. Spreaders and dollies have been used for this purpose.

Spreaders and dollies are basically flat three legged apparatuses, the legs of which are adjustable and which are connected to the tripod legs to hold them together and thereby prevent them from sliding outwardly.

In many uses, it is important that the spreader and tripod legs be able to be very quickly and easily connected and disconnected. This is particularly true in such cases as portable television news units where pictures must be obtained right away.

In the prior art, connecting and disconnecting the tripod legs has been cumbersome. Still further, in the prior art the operation of any mechanism for interconnecting the legs has required that the operator manipulate the mechanism with his hands, thereby necessitating that he release the expensive equipment supported on the tripod with the danger while doing so that the tripod may tip over and the equipment be damaged.

The present invention is directed to overcoming one or more of the problems as set forth above.

SUMMARY OF THE INVENTION

In one aspect of the present invention, there is disclosed an interlocking mechanism for the interlocking of adjustable tripod and spreader legs. The mechanism includes a pin fixed to the tripod leg, a pin receiving slot in the spreader leg, a latch plate pivotable with respect to the spreader leg and including a locking flange for retaining the pin in the slot, and biasing means for positioning the plate in its pin retaining position.

More specifically, the mechanism comprises a clevis supporting a pin on the tripod leg and an interlocking socket member supported on the end of the spreader leg. The socket member includes a lateral slot in which the pin is received and a longitudinal slot in which the latch plate is pivotably mounted. A spring biases the latch plate so that its locking flange holds the pin in the lateral slot. A releasing flange is provided on the latch plate permitting the plate to be pivoted against the biasing spring to release the pin from the lateral slot.

This mechanism provides a number of important advantages for users of tripods, particularly when users have expensive equipment and must set up the equipment in a hurry, such as for portable television news units. The mechanism permits the tripod and spreader legs to be quickly and easily connected and disconnected. Further, since the operator need not touch the mechanism with his hands, he may hold the tripod at the tripod plate where the equipment (such as a camera) is supported, thereby eliminating the danger of the tripod tipping over and damaging the equipment. Still further, this mechanism is so constructed as to ensure that the tripod leg when supported by the spreader leg will not become accidentally disconnected, even should the mechanism fail.

DESCRIPTION OF THE PREFERRED EMBODIMENT

Figure 1:
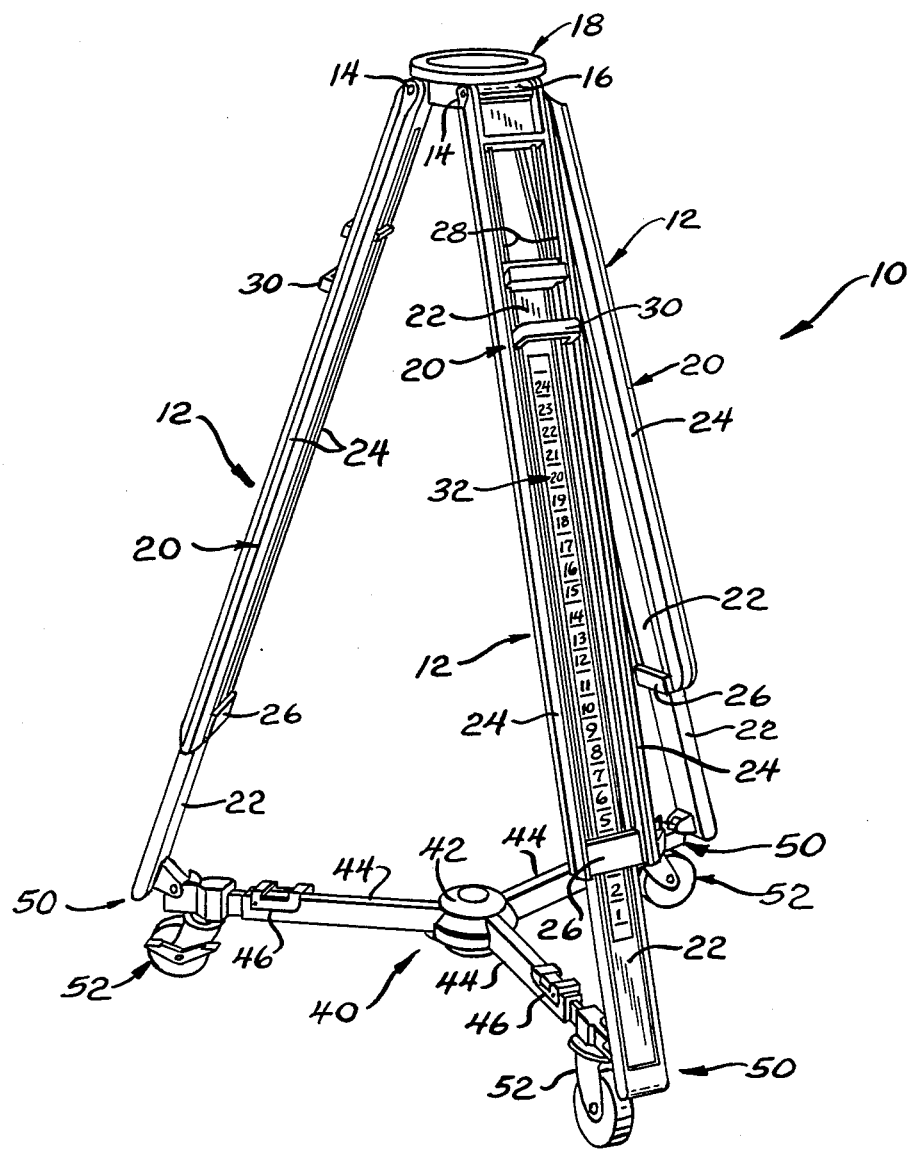
FIG. 1 is a perspective view of a tripod and spreader having the locking mechanism.

A tripod 10 having locking legs 12 is shown in perspective in FIG. 1. The legs 12 are pivotably secured in a suitable manner, such as a pin 14 in a sleeve 16, to the tripod plate 18. The type of tripod plate 18 used may differ depending on the intended use, with the tripod plate 18 shown in FIG. 1 being capable of fixing a portable television or film camera.

Each leg 12 has a fixed leg member 20 and a sliding leg member 22. The fixed leg member 20 has a pair of track members 24 which are interconnected at the top and bottom so as to be maintained in a parallel relationship. The interconnection of the track members 24 at the bottom comprises a pair of spaced guiding plates 26 which, together with the track members 24, define a rectangular opening (not seen in the figures). The track members 24 also include V-groove tracks 28 as will be more fully described hereafter.

The sliding leg member 22 slides within the defined rectangular opening of the fixed leg member 20 and is guided at its upper end along the V-groove tracks 28 of the track members 24. The upper end of the sliding leg member 22 not only guides the sliding leg member 22 but it also includes a handle 30 for operating a clamping mechanism which fixed the two leg members 20,22 together. Details of this mechanism are set forth more fully hereafter.

Accordingly, the two leg members 20,22 may be adjusted axially with respect to one another in an essentially telescopic fashion so as to permit adjustment of the overall length of the leg 12. A scale 32 is provided on each sliding leg member 22 to aid in adjusting the overall length of the three legs 12 as desired.

One material which has been found to be suitable for these components is Zytel, a tough, high strength nylon resin made by E. I. du Pont de Nemours & Co. Inc. of Wilmington, Del.

The tripod 10 as shown also includes a dolly or spreader 40 (a dolly is a spreader with wheels). The tripod 10 can of course be used without a dolly 40. However, in certain uses, particularly on hard, smooth surfaces, the dolly 40 is desirable since it can hold the legs 12 together so as to prevent them from sliding apart and further can be used to support the entire tripod 10 for movement across a surface.

The dolly 40 shown includes a hub 42 from which three spreader legs 44 project. The spreader legs 44 are telescopic to permit adjustment of their lengths, each spreader leg 44 having a locking mechanism with an easily accessible handle 46. At the end of each spreader leg 44 is a snap-lock pushbutton release mechanism 50 which enables the tripod legs 12 to be easily connected to and disconnected from the dolly 40. The locking and release mechanism 50 of each spreader leg 44 also includes a wheel or caster 52 on which the entire apparatus may be rolled.

Figure 2:
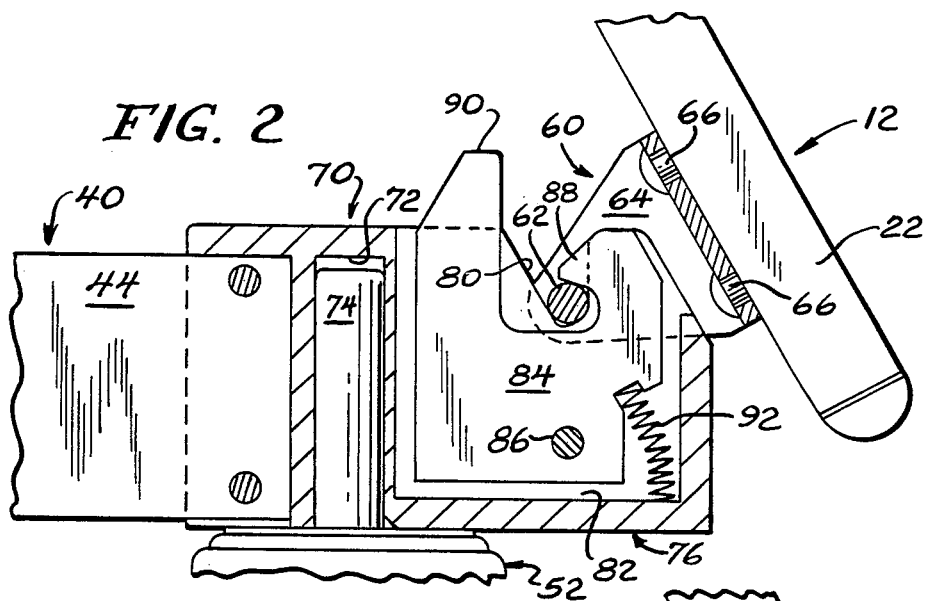
FIG. 2 is a cross-sectional view of the mechanism shown in the locked position.
Figure 3:
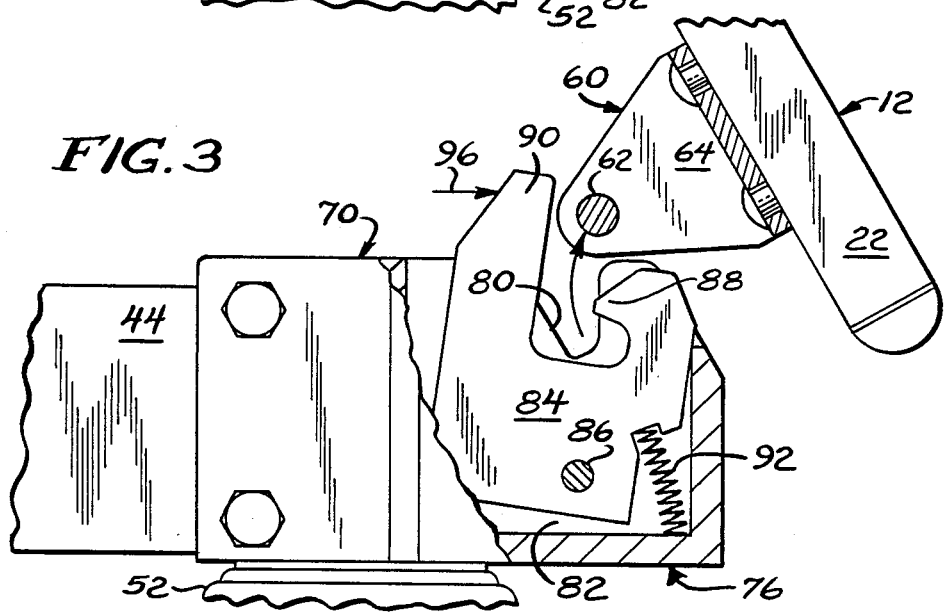
FIG. 3 is a partial cross-sectional view similar to FIG. 2 showing the mechanism in its released position.
Figure 4:
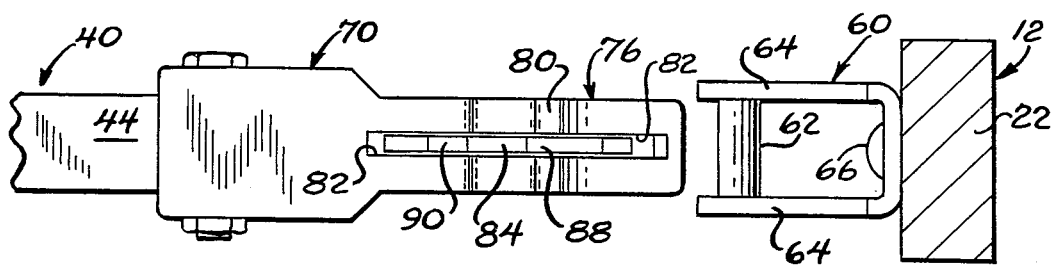
FIG. 4 is a elevational view of the mechanism.

The locking and release mechanisms 50 which are the subject of the present disclosure are shown in detail in FIGS. 2-4. Attached to the bottom of the sliding leg member 22 of each tripod leg 12 is a clevis 60 with a clevis pin 62 extending between the flanges 64 of the clevis 60. The clevis 60 may be attached to the sliding leg member 22 by any suitable means, such as bolts or rivets 66.

Attached to the end of the spreader leg 44 is a socket member 70 having the locking and release mechanism 50. The spreader 40 may be converted to a dolly by attaching casters 52 to the socket member 70 on each spreader leg 44. A hole 72 may be provided in each socket member 70 for receiving the upright pin 74 of the caster 52.

The width of the outer end 76 of the socket member 70 is approximately equal to the spacing between the flange 64 of the clevis 60 (see FIG. 4). This helps to prevent twisting of the tripod leg 12 relative to the spreader leg 44. The socket member outer end 76 includes a transverse slot 80 in which the clevis pin 62 is received for locking as will be detailed further below. The outer end 76 further includes a longitudinal slot 82 in which a latch plate 84 is pivotably mounted about a pin 86. The latch plate 84 includes a locking flange 88 for retaining the clevis pin 62 in the transverse slot 80. The latch plate 84 further includes a releasing flange 90 projecting above the socket member out end 76 for pivoting the latch plate 84 to release the clevis pin 62.

A compression spring 92 is provided between the latch plate 84 and the socket member outer end 76 to bias the latch plate 84 counterclockwise as shown in FIGS. 2 and 3 toward its locking position.

Operation of the locking and release mechanisms 50 can be seen from FIGS. 2-4. To connect a spreader leg 44 to a tripod leg 12, the operator can stand upright and, by holding the upper portion of the tripod leg 12, can position the leg 12 so that the clevis pin 62 is lowered into the transverse slot 80. The clevis pin 62 is directed by the slope of the slot 80 and the locking flange 88 toward the opening between the locking flange 88 and the slot 80 (best seen in FIG. 2), which opening is less than the diameter of the clevis pin 62. The clevis pin 62 when pushed into the opening applies a pivoting force to the locking flange 88, compressing the spring 92 and pivoting the latch plate 84 until the clevis pin 62 rests in the bottom of the transverse slot 80, at which point it disengages from the locking flange 88 and the compression spring 92 pivots the latch plate 84 to its pin retaining position as shown in FIG. 2. In this position, the tripod leg 12 and the spreader leg 44 are locked together so that if the tripod 10 is picked up, it would carry the spreader 40 with it.

To release a tripod leg 12, the operator, again standing upright, can push the releasing flange 90 in the direction of the arrow 96 shown in FIG. 3, thereby pivoting the latch plate 84. This moves the locking flange 88 free of the transverse slot 80 so that the clevis pin 62 can be lifted from the transverse slot 80 to disconnect the tripod leg 12.

This locking and release mechanism 50 provides a number of important advantages in the field. It may be operated quickly and easily, both during set up and disassembly. This is important to many users such as field teams for television news units. Further, when connecting and disconnecting the tripod legs 12, the operator can hold the tripod 10 at the tripod plate 18 where the equipment, such as a camera, is supported. Therefore, the operator does not have to bend over and release the equipment with the danger that the tripod 10 may tip over and damage the equipment. Still another advantage is that the tripod legs 12 will be restrained against sliding out even if one of the locking and release mechanisms 50 should break, including for example the loss of an entire latch plate 84.

Other aspects, objects and advantages of this invention can be obtained from a study of the drawings, the disclosure and the appended claims.

I claim:

1. In an apparatus including a tripod having three legs and a spreader having three legs, said spreader legs and tripod legs being easily connectable to and disconnectable from one another by an operator to secure the tripod in or release it from a desired configuration, quick release interlocking mechanisms for securing each of said tripod legs to a respective spreader leg, each interlocking mechanism comprising:

a pin fixed to said tripod leg;

a V-slot in said spreader leg for receiving said pin;

a clevis on said tripod leg, said clevis having flanges between which said pin extends, said flanges being adapted to engage opposite sides of said spreader leg when the pin is received in the V-slot;

a latch plate pivotable with respect to said spreader leg, said plate including a locking flange for retaining said pin in said slot and releasing flange engagable by an operator's foot to pivot said plate away from its retaining position; and means for biasing said plate toward its pin retaining position.

2. The mechanism of claim 1 wherein said pin engages said locking flange when connecting said legs to pivot said plate against said biasing means, and said pin releases said locking flange when in its retained position.

3. The mechanism of claim 1, further comprising a longitudinal slot in said spreader leg, said latch plate being pivotable within said longitudinal slot and said pin receiving V-slot extending normal to and across said longitudinal slot.

4. An interlocking mechanism adapted for easy connecting and disconnecting of a tripod leg and a spreader leg by an operator, comprising:

a socket member fixed to said spreader leg, said socket member including a first slot longitudinally aligned with respect to said spreader leg and a second slot having a V configuration and extending laterally of said spreader leg;

a clevis fixed to said tripod leg and supporting a pin, said pin receivable within said second slot with said clevis engaging opposite sides of said socket member;

a latch plate pivotably mounted within said first slot, said latch plate having a slot open with said second socket member slot and said latch plate further including a locking flange extendable over said second socket member slot when said latch plate is in a pin retaining position;

a releasing flange on said latch plate projecting from said socket member and engagable by the operator's foot to pivot said latch plate away from its pin retaining position; and a compression spring biasing said latch plate toward its pin retaining position.

* * * * *